March 18, 1969     J. L. CHANEY     3,433,076
THERMOMETER
Filed Oct. 12, 1966
FIG-1
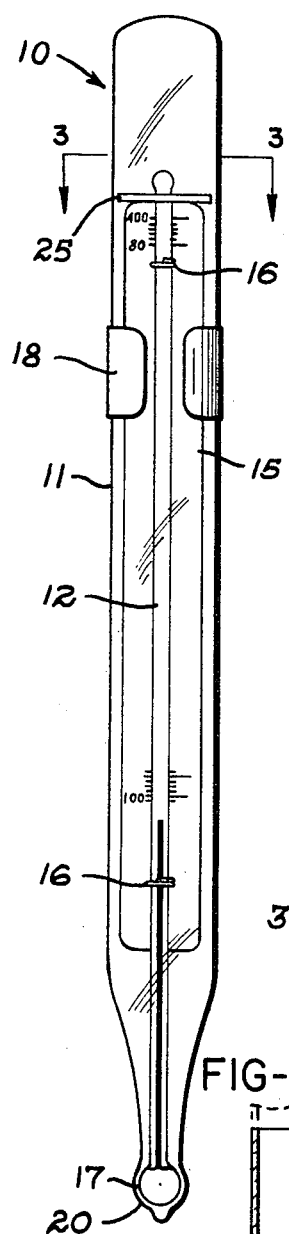
FIG-2
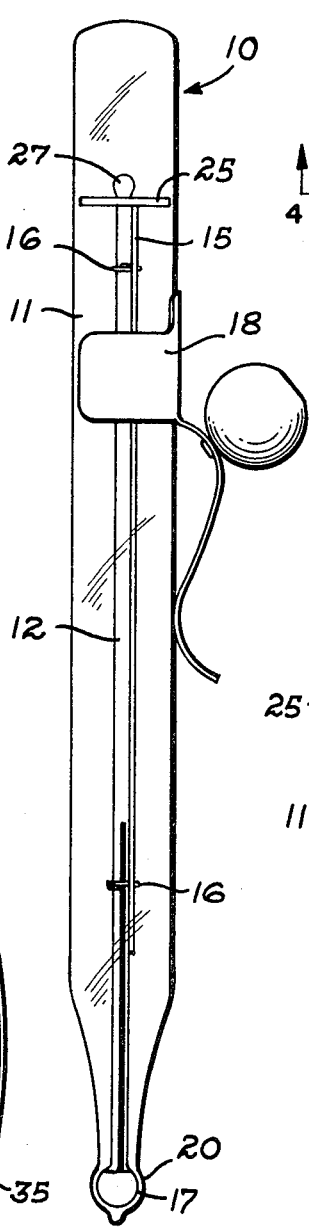
FIG-3
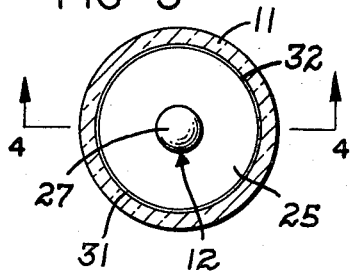
FIG-4
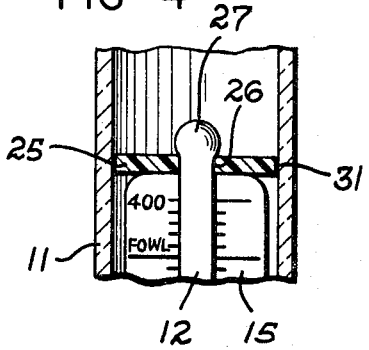
FIG-6
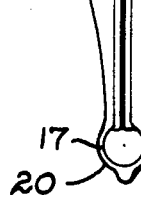
FIG-7
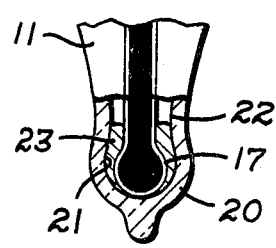
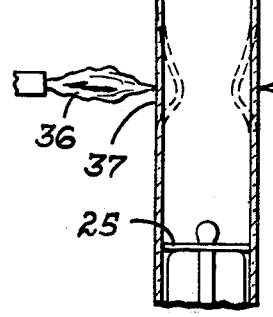
FIG-5
INVENTOR.
JOHN L. CHANEY
BY
Marechal, Biebel, French & Bugg
ATTORNEYS

United States Patent Office 3,433,076
Patented Mar. 18, 1969

3,433,076
THERMOMETER
John L. Chaney, Lake Geneva, Wis. 53147
Filed Oct. 12, 1966, Ser. No. 586,289
U.S. Cl. 73—374
Int. Cl. G01k 1/14
1 Claim

ABSTRACT OF THE DISCLOSURE

An improved thermometer of the type that includes a mercury tube within an outer glass housing. A scale is also within the glass housing. A polyethylene washer is mounted on the upper end of the thermometer tube and is at least 1/16 inch in thickness to prevent tilting thereof. The polyethylene washer also has an outer diameter less than that of the inner diameter of the glass housing to provide an annular space for air flow above and below the washer.

---

This invention relates to improvements in thermometers, and more particularly to improvements which permit the thermometer to resist breaking.

Specifically, this invention relates to an improvement over the thermometer shown in my U.S. Patent No. 2,051,540, issued Aug. 18, 1936. That is, this invention relates to thermometers which consist of an outer glass tube having a thermometer element mounted centrally therein spaced from the inner wall of the glass tube. The lower end of the thermometer element is secured in a spherical portion at the bottom of the outer tube. A scale is secured on the thermometer element, and the spherical ball inserted into the candy or other material whose temperature is being measured. In the past, substantial breakage has occurred in such thermometers due to production problems and to the normal shocks which are present during the shipping and handling of such thermometers due to the thermometer element being forced against the side of the glass tube and broken.

An important object of this invention is to provide a thermometer of the aforesaid type which resists breakage due to sudden shocks and which can be easily and quickly assembled, and which facilitates high speed manufacture thereof.

Another object of this invention is to provide a thermometer of the aforesaid type wherein a centering washer is provided on the upper end of the thermometer element in such a manner that no interference is created with the assembling of the thermometer, and further to provide a resilient disk shaped washer which conforms to the upper end of the scale to center the tube and scale.

A further object of this invention is to provide a thermometer of the aforesaid type which is inexpensive in cost and simple in design for dependable operation over a substantial period of time.

Other objects and advantages of the invention will be apparent from the following description, the accompanying drawing and the appended claim.

In the drawing:
FIG. 1 is an elevation view of the thermometer showing the front of the scale;
FIG. 2 is a side view of the thermometer looking from right to left of FIG. 1;
FIG. 3 is a sectional view taken along the line 3—3 of FIG. 1;
FIG. 4 is an enlarged sectional view taken along the line 4—4 of FIG. 3;
FIG. 5 is an enlarged fragmentary view, partially in section, of the lower tip of the thermometer;
FIG. 6 is a sectional view of the upper portion of the thermometer showing the manner in which the thermometer is assembled and sealed; and
FIG. 7 is a view similar to FIG. 6 showing the upper portion sealed.

Referring to the drawing wherein a preferred embodiment of the invention is illustrated, the thermometer 10 includes an elongated tubular glass housing 11 having a thermometer element 12 mounted centrally therein. A scale card 15 is secured to the thermometer element 12 by small clips 16 in a conventional manner, so that the colored fluid within the thermometer element 12 is raised and lowered proportional to the temperature at the spherical bulb 17 at the base of this element.

A flexible clip 18 may be provided for securing the thermometer 10 to the side of a pan or the like. The lower end of the tubular housing has a ball shaped portion 20 formed therein with a spherical inner surface 21 whose neck 22 has a smaller diameter than the adjacent lower portion thereof. Thus, by inserting the bulb 17 of the thermometer element 12 in this portion of the housing 11, melting a metal 23 around the bulb 17, and subsequently letting this metal 23 solidify, the bulb 17 cannot be removed from this ball shaped portion 20 of the housing 11. Because the metal 23 contracts slightly upon solidification, it is possible for the bulb 17 and the metal 23 to pivot within the lower ball shaped end portion 20 of the glass housing 11.

Heretofore, it was impractical to utilize a centering disk of the type shown in the aforesaid Patent No. 2,051,540 and therefore the thermometer element usually rested against the side of the glass housing and was frequently broken or damaged during shipment and use since the thermometer element was free to pivot within the housing. Moreover, this made reading of the scale somewhat difficult since it normally did not extend centrally within the tubular housing.

The difficulty with the device shown in the aforesaid patent was that the disks were made of cardboard and were designed to have a snug fit with the inside of the glass housing 11. This presented a substantial problem in the manufacture of the thermometers since it was necessary to place the metal within the bottom of the housing, then heat the lower tip until the metal melted, and then quickly insert the thermometer element and allow the metal to solidify therearound. Since the cardboard disk fitted snugly within the tube, it was impossible to quickly slide the thermometer element 12 in place as the disk trapped air below the washer as it was forced downwardly into the tube. Consequently, for over thirty years these disks were thought to be impractical and impossible to use.

An impotrant feature of this invention relates to the novel washer 25 which applicant has devised to overcome the aforesaid problems. Accordingly, the resilient washer 25 is made of plastic or rubber material and is precisely formed with an inner opening 26 slightly smaller than the enlarged portion 27 on the top of the thermometer element 12. Because the washer 25 is resilient, it can be slipped over this enlarged portion 21 and held snugly on the thermometer element 12 adjacent the upper end of the scale 15.

The outer diameter of the washer 25 is precisely controlled so that it is somewhat less than the inner diameter of the glass tube 11 and therefore the thermometer element 12 with the washer 25 in place can be easily slipped into the tube during manufacture. The air is not trapped below the washer and flows around the washer through the space 31 between the outer periphery 32 thereof and the inner side wall of the glass tube 11.

Breakage is eliminated even though shock occurs when the thermometer 10 is dropped because the washer 25 is resilient and thus absorbs the shock as the thermometer element 12 is forced toward the side walls of the tube 11. In addition, the washer 25 holds the thermometer element 12 with the scale thereon substantially central within the glass tube for easy and more accurate viewing.

A preferred embodiment of the invention utilizes a glass tube 11 having an inner diameter of between .664 inch and .743 inch, and a washer made of polyethylene plastic 1/16 inch thick and having an outer diameter of .609 inch plus or minus .015 inch.

Another very important feature of the invention is illustrated in FIGS. 5 and 6 which show the manner in which the upper end 35 of the tube 11 is sealed. Heretofore, the flame 36 was applied around the outer surface in the area where the tube 11 was to be sealed. The upper end 35 of the tube above the heated area 37 is then carefully pulled in an axial direction by a tool 38 causing the heated portion 37 to buckle (see broken lines in FIG. 6) and eventually seal the tube. Heretofore, in the process of applying the heat, the air within the interior of the entire tube 11 was heated since there was free circulation of air therein. When the upper wall 40 of the tube is sealed, the increased air pressure within the tube frequently caused this upper wall to be blown out or to be expanded before it cooled sufficient so that it was very thin and thus easily broken.

With the present invention, the high pressure air created in the space 41 above the washer 25 and below the area being sealed is relieved since the air gradually flows through the space 31 into the lower portion of the tube and thus the high pressure is relieved. As a result, much higher flame temperature can be used and less care need be taken in withdrawing the upper portion of the tube during the sealing operation. This provides increase in the rate of manufacture, as well as a decrease in the rate of rejected thermometers.

The invention has thus provided an improved thermometer which greatly reduces breakage and which can be easily and quickly assembled. This results from the novel washer 25 which is constructed of a resilient material for absorbing shock and is precisely designed so that it is spaced a distance from the inner wall of the glass tube to provide for free flow of air around the washer. The washer also substantially centers the thermometer element so that it can be read with ease, and the over-all appearance of the thermometer is improved.

While the form of apparatus herein described constitutes a preferred embodiment of the invention, it is to be understood that the invention is not limited to this precise form of apparatus, and that changes may be made therein without departing from the scope of the invention.

What is claimed is:
1. In a thermometer including, an outer generally tubular transparent tubular housing, an integral wall sealing the upper end wall of said tubular housing, a spherical bulb formed at the lower end of said housing, means defining a neck in said housing adjacent said bulb having a diameter smaller than the internal diameter of said bulb, a tubular thermometer element mounted within said housing, an enlarged ball on the lower end of said thermometer element having an outer diameter greater than the outer diameter of said element but slightly smaller than the inner diameter of said neck, metal means hardened around said enlarged ball for locking the same in said spherical bulb while permitting relative movement between said ball and said bulb, an enlarged portion on the upper end of said thermometer element, a calibrated scale secured to said thermometer element, the improvement which comprises a disk-shaped washer member made of resilient material and having a central opening therein with a diameter slightly less than the outer diameter of said thermometer element, said washer member being disposed on said thermometer element between said enlarged portion and said scale, said washer member being made of polyethylene at least 1/16 inch thick to hold said washer member in a radial position on said thermometer element, to prevent said washer from canting on said thermometer element, said washer member having an outer diameter which is slightly less than the inner diameter of said tubular housing and being spaced from said upper end wall a preset distance so that air flows around said washer member during assembly but the air in the lower portion thereof is not heated substantially during sealing of said upper end, said washer member adapted to absorb the shock to which said housing is subjected and holds said thermometer element centered in said housing.

References Cited
UNITED STATES PATENTS

| 2,051,540 | 8/1936 | Chaney | 73—374 |
| 2,906,124 | 9/1959 | Chaney | 73—374 |

FOREIGN PATENTS

| 280,732 | 11/1927 | Great Britain. |

LOUIS R. PRINCE, *Primary Examiner.*

W. HENRY, *Assistant Examiner.*